United States Patent
Sugiyama et al.

(10) Patent No.: US 10,091,381 B2
(45) Date of Patent: Oct. 2, 2018

(54) IMAGE PRINTING APPARATUS AND METHOD FOR CONTROLLING THE IMAGE PRINTING APPARATUS EXECUTABLE INTERRUPTION PRINT

(71) Applicant: BROTHER KOGYO KABUSHIKI KAISHA, Nagoya-shi, Aichi-ken (JP)

(72) Inventors: Takashi Sugiyama, Nagoya (JP); Tony Lee, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/366,729

(22) Filed: Dec. 1, 2016

(65) Prior Publication Data

US 2017/0163822 A1 Jun. 8, 2017

(30) Foreign Application Priority Data

Dec. 3, 2015 (JP) ................................. 2015-236223

(51) Int. Cl.
*G06F 3/12* (2006.01)
*H04N 1/00* (2006.01)
*H04N 1/21* (2006.01)

(52) U.S. Cl.
CPC ......... *H04N 1/0096* (2013.01); *H04N 1/2158* (2013.01); *H04N 1/2175* (2013.01); *H04N 2201/0081* (2013.01); *H04N 2201/0094* (2013.01)

(58) Field of Classification Search
CPC ............. H04N 1/00915; H04N 1/0096; H04N 1/2158; H04N 1/2175; H04N 1/32561; H04N 1/3248; H04N 2201/0081; H04N 2201/0094; G03G 15/231; G03G 15/50
USPC .................................................. 358/1.1–1.18
See application file for complete search history.

(56) References Cited

U.S. PATENT DOCUMENTS

| | | | |
|---|---|---|---|
| 5,812,907 A | 9/1998 | Itoh et al. | |
| 2002/0012135 A1* | 1/2002 | Nagaso | H04N 1/00912 358/400 |
| 2002/0015599 A1* | 2/2002 | Takuwa | G03G 15/5012 399/82 |
| 2005/0100378 A1* | 5/2005 | Kimura | G06F 3/1222 400/76 |

FOREIGN PATENT DOCUMENTS

| | | |
|---|---|---|
| JP | 8-123260 A | 5/1996 |
| JP | 3266118 B2 | 3/2002 |
| JP | 3812534 B2 | 8/2006 |

* cited by examiner

*Primary Examiner* — Gabriel Garcia
(74) *Attorney, Agent, or Firm* — Merchant & Gould P.C.

(57) ABSTRACT

An image printing apparatus includes a printer assembly, a control panel configured to receive a user input, a memory, and a controller. The controller is configured to receive first data from a first data source such as a PC external to the printer assembly, store the first data in the memory, and control the printer assembly to print a first image based on the first data stored in the memory. In response to a first user input received from the control panel during the print of the first image, the controller is configured to receive second data from a second data source such as a scanner assembly, and store the second data in the memory during the print of the first image.

33 Claims, 10 Drawing Sheets

IMAGE PRINTING APPARATUS AND METHOD FOR CONTROLLING THE IMAGE PRINTING APPARATUS EXECUTABLE INTERRUPTION PRINT

CROSS-REFERENCE TO RELATED APPLICATION

This application claims priority from Japanese Patent Application No. 2015-236223 filed on Dec. 3, 2015, the content of which is incorporated herein by reference in its entirety.

FIELD OF DISCLOSURE

The disclosure relates to an image printing apparatus and a method for controlling the image printing apparatus executable interruption print.

BACKGROUND

A known image printing apparatus, e.g., a multi-function apparatus, has a plurality of functions, e.g., a print function and a copy function. The print function enables a printer of the multi-function apparatus to execute printing. More specifically, the multi-function apparatus may receive image data from an external device, e.g., a personal computer. The image data is temporarily stored in a memory and is developed or converted into print data. The printer executes printing based on the print data. The copy function enables a scanner of the multi-function apparatus to scan a document, to produce its image data, and the printer to execute printing. More specifically, the image data is stored in the memory and is converted into print data. The printer executes printing based on that print data to produce a copy of the document.

If the multi-function apparatus is shared among multiple users, a user may execute the copy function while the multi-function apparatus is executing the print function based on another user's instruction. In such case, the copy function may follow the print function (e.g., the copy function starts after completion of the print function), or the print function may be paused for the interrupt copy function.

SUMMARY

In accordance with certain aspects of the present disclosure, an image printing apparatus includes a printer assembly, a control panel configured to receive a user input, a memory, and a controller. The controller is configured to receive first data from a first data source such as a PC external to the printer assembly, store the first data in the memory, and control the printer assembly to print a first image based on the first data stored in the memory. In response to a first input received from the control panel during the print of the first image, the controller is configured to receive second data from a second data source such as a scanner assembly, and store the second data in the memory during the print of the first image.

DETAILED DESCRIPTION

Figure 1:
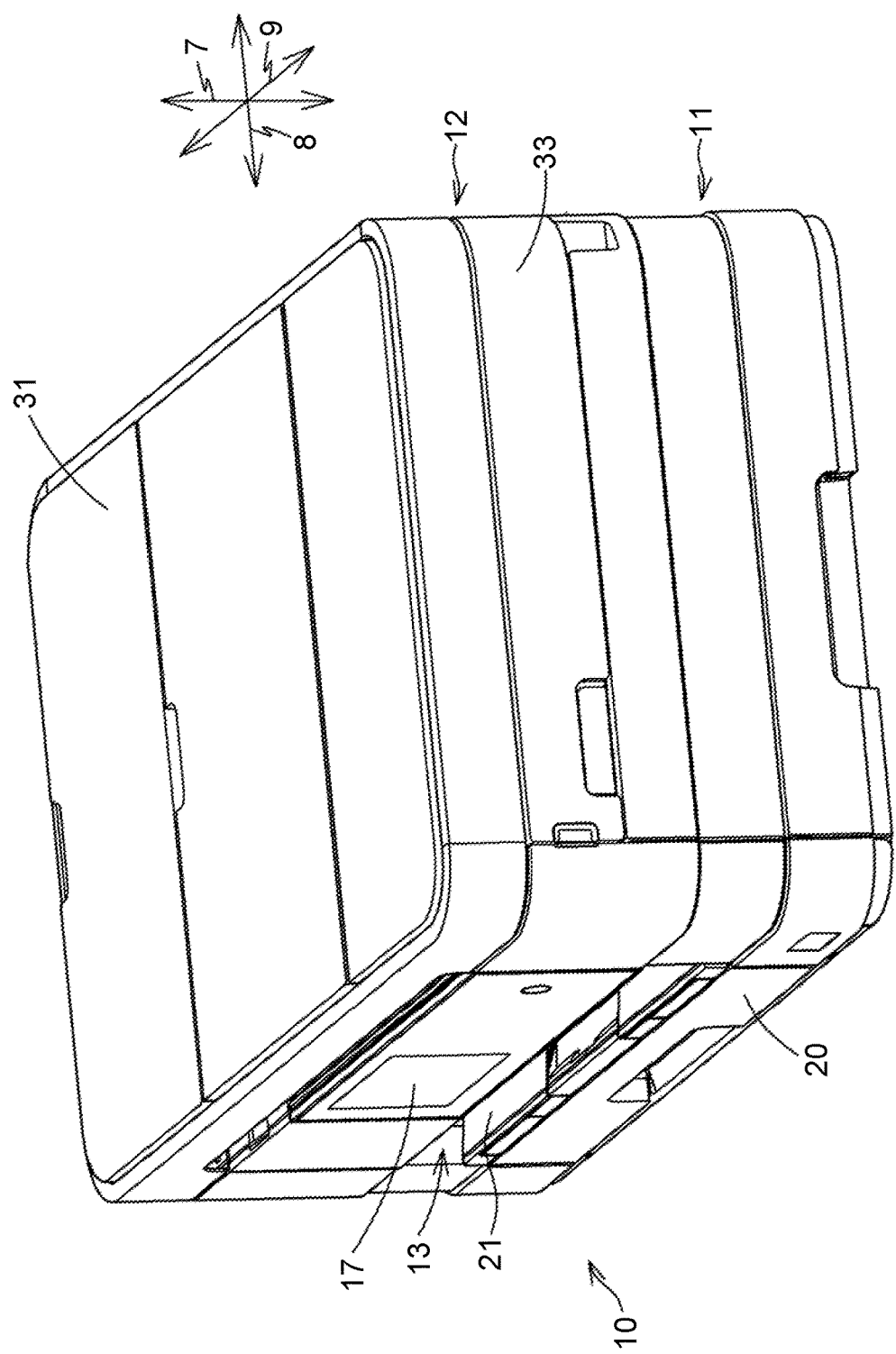
FIG. 1 is a perspective view of a multi-function apparatus in an illustrative embodiment according to one or more aspects of the disclosure.

An illustrative embodiment and modifications according to one or more aspects of the disclosure are described in detail with reference to the accompanying drawings. While the disclosure is described in detail with reference to specific embodiments thereof, this is merely an example, and various changes, arrangements and modifications may be applied therein without departing from the spirit and scope of the disclosure. In the following description, a top-bottom direction 7 may be defined in conjunction with an orientation in which a multi-function apparatus 10 is intended to be used, as depicted in FIG. 1. A side of the multi-function apparatus 10 having an opening 13 may be defined as a front side. A front-rear direction 8 may be defined in conjunction with the front side. A left-right direction 9 may be defined in conjunction with the multi-function apparatus 10 as viewed from its front side.

In interrupt printing (interrupt copying), a sufficient memory capacity for storing data for the print function and the copy function may enable the copy function to be executed while the memory retains data for the suspended print function. A size of data to be stored in the memory tends to increase due to various print and copy features, e.g., photographic printing and multiple page printing per sheet. The multi-function apparatus may include memory with sufficient capacity for interrupt printing/copying, which adds costs. In some cases, the print function may be continued until some area in the memory becomes available for interrupt printing/copying. After that, the copy function may be executed by suspending the print function. Although this configuration may avoid increase in memory capacity, it may lead to increase in a user's waiting time in the interrupt printing/copying.

One or more aspects of the disclosure are to provide a technique that may prevent or reduce increase in memory capacity and that reduce the waiting time in the interrupt printing/copying.

[Overall Structure of Multi-Function Apparatus 10]

As depicted in FIG. 1, an image printing apparatus, e.g., the multi-function apparatus 10, has generally a thin rectangular parallelepiped shape. The multi-function apparatus 10 has various functions, e.g., a printing function and a copying function. The print function includes receiving data transmitted from an external device and printing an image corresponding to the received data. The external device may be, for example a personal computer (PC), configured to communicate with the multi-function apparatus 10. The copy function includes copying an image on a document, which is placed on a scanner assembly 12 (described below). More specifically, the copy function includes printing an image corresponding to data generated by scanning the image on the document with the scanner assembly 12. The copy function may be executed in response to a user's input on a control panel 17 (described below). The multi-function apparatus 10 includes a printer assembly 11 disposed at a lower portion thereof. The printer assembly 11 is configured to record or print an image onto a recording medium, e.g., a sheet S (refer to FIG. 2), by, for example, an inkjet recording method. The multi-function apparatus 10 further includes an image-data-obtaining device, e.g., the scanner assembly 12. The scanner assembly 12 is disposed at an upper portion of the multi-function apparatus 10. The scanner assembly 12 is configured to scan an image on a document. The scanner assembly 12 is, for example, of a flatbed type. The multi-function apparatus 10 further includes a controller 130 (described below) configured to control, for example, print function operations and copy function operations of the multi-function apparatus 10. The scanner assembly 12 is not limited to a flatbed type but may be of an auto-document feeder type.

[Printer Assembly 11]

Figure 2:
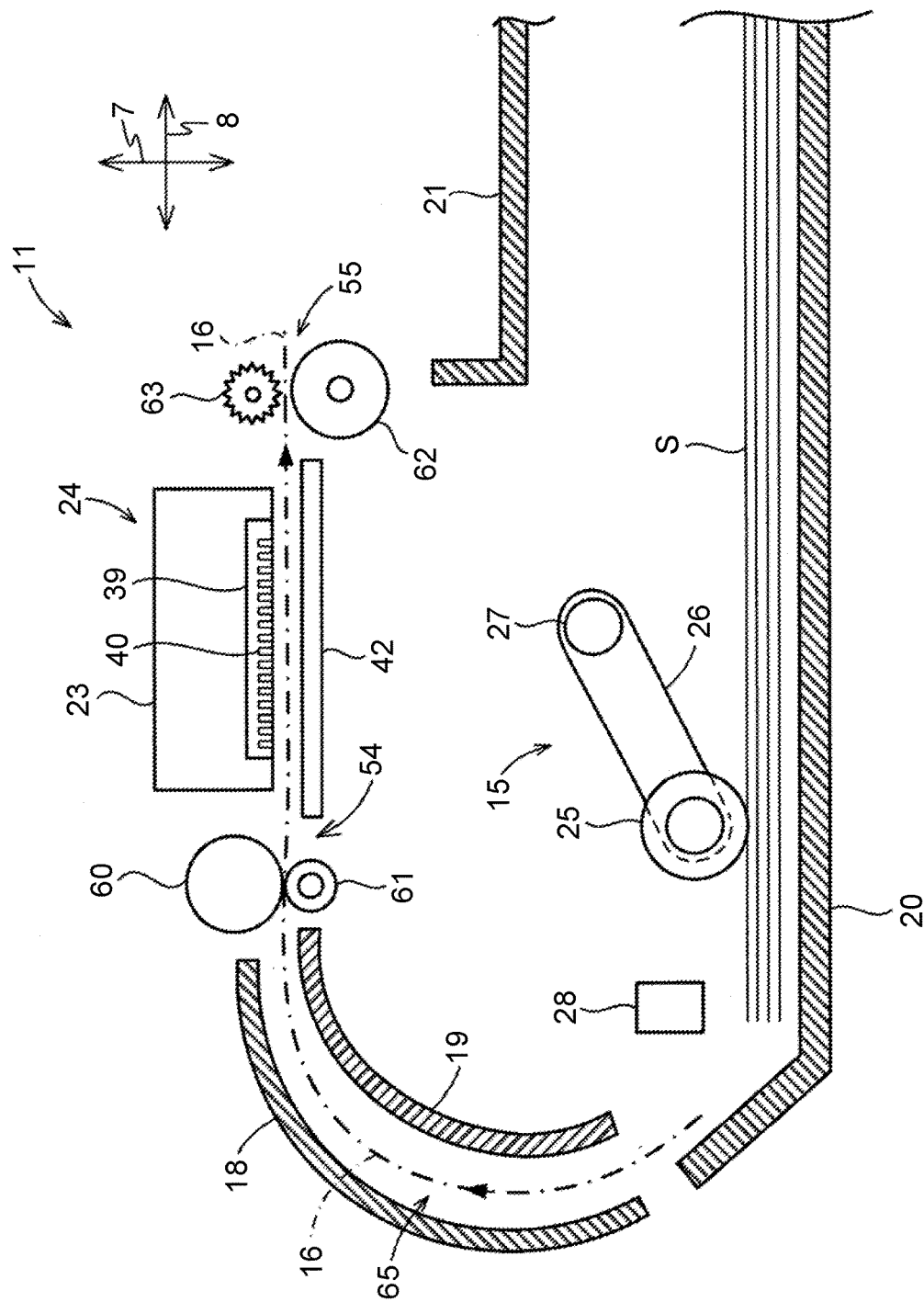
FIG. 2 is a vertical sectional view of a printer assembly, depicting an internal structure thereof.

As depicted in FIG. 2, the printer assembly 11 includes a conveyor, a printer 24, and a platen 42. The conveyor conveys a sheet S. The printer 24 prints an image on the sheet S conveyed by the conveyor. The platen 42 supports the sheet S being conveyed by the conveyor. The conveyor includes a sheet feeder 15, a feed tray 20, a discharge tray 21, a conveyance roller unit 54, and a discharge roller unit 55.

Figure 4:
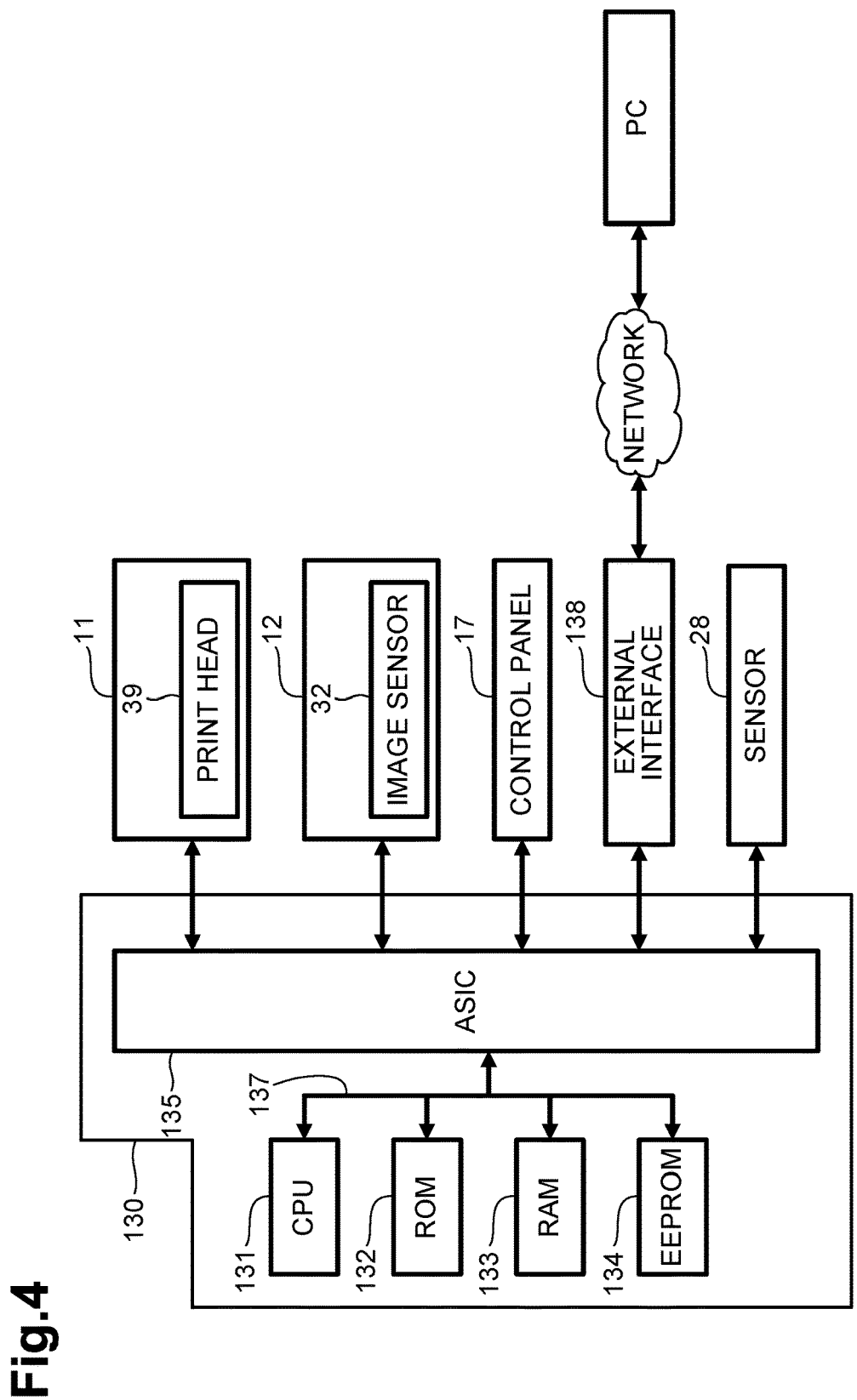
FIG. 4 is a block diagram of the printer assembly.

As depicted in FIGS. 1 and 2, the front surface of the printer assembly 11 has an opening 13. The feed tray 20 is inserted or removed through the opening 13 along the front-rear direction 8. The feed tray 20 supports a stack of sheets S. The discharge tray 21 is disposed above the feed tray 20. The discharge tray 21 supports the sheet S discharged through the opening 13 by the discharge roller unit 55. As depicted in FIG. 4, a sensor 28 detects movement of the feed tray 20. The sensor 28 may include a mechanical switch and an optical sensor.

As depicted in FIG. 2, the sheet feeder 15 includes a feed roller 25, a feed arm 26, and a shaft 27. The feed roller 25 is rotatably supported at an end of the feed arm 26. The feed roller 25 rotates, in response to the rotation of a motor (not depicted). The feed roller 25 rotates to convey a sheet S supported by the feed tray 20 toward a conveying path 65 (described below) along a conveying direction 16. The feed arm 26 is pivotally supported about a shaft 27. The shaft 27 is supported by a frame of the printer assembly 11.

As depicted in FIG. 2, the printer assembly 11 has the conveying path 65. The conveying path 65 allows a sheet S to pass therethrough. Guide members 18 and 19 face each other in the printer assembly 11 with a predetermined distance therebetween. And the guide members 18 and 19 define the conveying path 65. The sheet S is conveyed along the conveying path 65 in the conveying direction 16, as depicted by a dot-and-dash line with an arrow in FIG. 2.

The conveying path 65 includes a curved path and a linear path. The curved path extends upward from a lower rear end portion of the printer assembly 11 while making U-turn. The linear path extends from the conveyance roller unit 54 to the discharge tray 21 via the printer 24 and the discharge roller unit 55.

As depicted in FIG. 2, the conveyance roller unit 54 is disposed upstream of the printer 24 in the conveying direction 16. The conveyance roller unit 54 includes a conveying roller 60 and a pinch roller 61 that face each other. The conveying roller 60 is driven by a motor (not depicted). The pinch roller 61 is rotated by the rotation of the conveying roller 60.

As depicted in FIG. 2, the discharge roller unit 55 is disposed downstream of the printer 24 in the conveying direction 16. The discharge roller unit 55 includes a discharge roller 62 and a spur 63 that face each other. The discharge roller 62 is driven by a motor (not depicted). The spur 63 is rotated by the rotation of the discharge roller 62.

[Printer 24]

As depicted in FIG. 2, the printer 24 is disposed between the conveyance roller unit 54 and the discharge roller unit 55 in the conveying direction 16. The printer 24 faces the platen 42 in the top-bottom direction 7. The printer 24 includes a carriage 23 and a print head 39. Although not illustrated in the drawings, an ink tube and a flexible flat cable extend from the carriage 23. Ink in the ink cartridge is supplied through the ink tube to the print head 39. The flexible flat cable electrically connects a control board including the controller 130, and the print head 39.

As depicted in FIG. 2, the print head 39 is mounted on the carriage 23. The print head 39 has a plurality of nozzles 40 on a lower surface thereof. The print head 39 is configured to eject ink from the nozzles 40 as very small ink droplets. Drive force from a motor (not depicted) causes the carriage 23 to move in the left-right direction 9. While the carriage 23 is moving in the left-right direction 9, the print head 39 ejects ink droplets onto the sheet S, which is conveyed by the conveyance roller unit 54 and supported by the platen 42. An image is thus recorded on the sheet S.

[Scanner Assembly 12]

Figure 3:
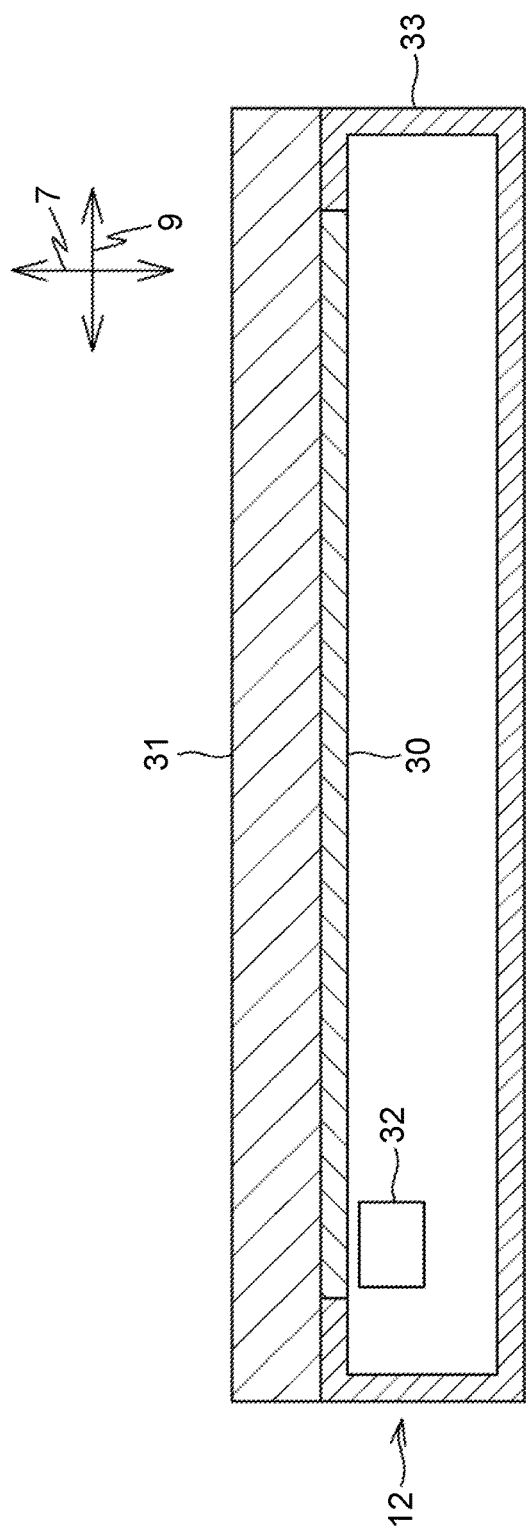
FIG. 3 is a vertical sectional view of a scanner assembly, depicting an internal structure thereof.

As depicted in FIG. 3, the scanner assembly 12 includes a platen glass 30, a document cover 31, an image sensor 32, and a casing 33. The platen glass 30 supports a document. The document cover 31 covers and uncovers the platen glass 30. The image sensor 32 is disposed directly below the platen glass 30.

The platen glass 30 is a translucent member disposed at an upper surface of the casing 33. The upper surface of the platen glass 30 has a size corresponding to a size of a document that can be scanned by the multi-function apparatus 10. For example, the upper surface of the platen glass 30 may have a size slightly greater than, for example, an A4 size specified in Japanese Industrial Standards, to allow an A4-sized document to be scanned.

The document cover 31 is pivotally coupled to the casing 33. In a state in which the distal end of the document cover 31 is in contact with or closer to the casing 33, the lower surface of the document cover 31 covers the upper surface of the platen glass 30, thereby fixing or positioning a document in place on the platen glass 30. The document cover 31 may prevent natural light from entering into the casing 33 through the platen glass 30. In a state in which the distal end of document cover 31 is away from the casing 33, the document cover 31 is separated from the platen glass 30, allowing a document to be placed on or removed from the platen glass 30.

The image sensor 32 is disposed inside the casing 33. The image sensor 32 is configured to move inside the casing 33 below the platen glass 30 along the left-right direction 9. The image sensor 32 includes a plurality of optical sensors arranged at least along the front-rear direction 8 (e.g., direction orthogonal to a sheet of FIG. 3). The image sensor 32 irradiates light to the platen glass 30 along a scanning line, e.g., an arrangement direction of the optical sensors. The optical sensors detect the light reflected off a document on the platen glass 30. An image on the document is scanned along the scanning line while the image sensor 32 is moving along the left-right direction 9. Eventually, an image on an entire document is optically scanned, and is output as electrical signals.

[Control Panel 17]

The control panel 17 is disposed at the front surface of the multi-function apparatus 10. The control panel 17 includes a touch-panel display. The control panel 17 displays information for users and allows user inputs. For example, the control panel 17 allows inputs for starting, for example, the copy function, and data reading from a portable storage media.

[Controller 130]

As depicted in FIG. 4, the controller 130 includes a central processing unit (CPU) 131, a read only memory (ROM) 132, a memory, e.g., a random-access memory (RAM) 133, an electrically erasable programmable read only memory (EE-PROM) 134, and an application specific integrated circuit (ASIC) 135, which are interconnected by an internal bus 137. The ROM 132 stores various programs. The CPU 131 executes various processing based on the programs. The ROM 132 or the EEPROM 134 stores programs to be executed by the multi-function apparatus 10, e.g., for processing associated with interrupt print processing (interrupt copying) (described below). The associated processing includes, for example, print data conversion module 1 in FIG. 7, second data conversion module 2 in FIG. 8, and print module 3 in FIG. 9. The RAM 133 provides a memory area and a work area. The memory area temporarily stores data and signals to be used by the CPU 131 for executing the programs. The work area is used for data processing. The EEPROM 134 retains necessary settings and flags even after power supply of the multi-function apparatus 10 is off.

The ASIC 135 is connected to the print head 39 of the printer 24, the image sensor 32 of the scanner assembly 12, and the sensor 28 detect the movement of the feed tray 20, to allow data and signals to be transmitted to and received from those components. The ASIC 135 generates drive signals for driving the print head 39 of the printer 24 and the image sensor 32. The ASIC 135 controls the print head 39 of the printer 24 and the image sensor 32 based on the drive signals. The ASIC 135 generates drive signals for a motor for moving the carriage 23 of the printer 24 and the image sensor 32, as well as drive signals for a motor for rotating the feed roller 25 and the respective rollers 60 and 62. The ASIC 135 displays user interface in the display of the control panel 17, and receives user inputs through the control panel 17. The ASIC 135 is connected to a communication interface, such as an external interface 138. The external interface 138 includes, for example, a local area network (LAN) line and a universal serial bus (USB) line. The ASIC 135 is connected to an external device, e.g., a personal computer (PC), via the external interface 138, to allow data communication therebetween.

The ROM 132 or the EEPROM 134 stores programs to be executed by the controller 130 (e.g., CPU 131). The programs include, for example, programs for processing associated with the interrupt print processing (interrupt copying) (described below), e.g., print data conversion module 1 depicted in FIG. 7, second data conversion module 2 in FIG. 8, and print module 3 in FIG. 9. In another embodiment, the programs may be stored in an external server connected to the multi-function apparatus 10 via the external interface 138. In this case, for example, a user may operate a PC connected via the multi-function apparatus 10 or the multi-function apparatus 10 itself. In response to the user operation, the multi-function apparatus 10 may obtain the programs stored in the external server via the external interface 138. The programs obtained by the multi-function apparatus 10 may be downloaded (e.g., stored) into the ROM 132 or the EEPROM 134.

[Interrupt Copying (Interrupt Print Processing)]

Interrupt copying in the multi-function apparatus 10 is now described. The multi-function apparatus 10 is connected to a first data source, e.g., an external device such as a PC, via the external interface 138, to allow data communication therebetween. The external device generates data to be printed by the printer assembly 11 of the multi-function apparatus 10. A user operation of the external device causes first data to be printed, to be output from the external device to the multi-function apparatus 10 (e.g., the external interface 138). The first data includes a page description language (PDL) data representing a text and an image to be printed. The first data further includes bitmap data including arrays of information for pixels constituting a text and an image to be printed, and compressed bitmap data.

Figure 5:
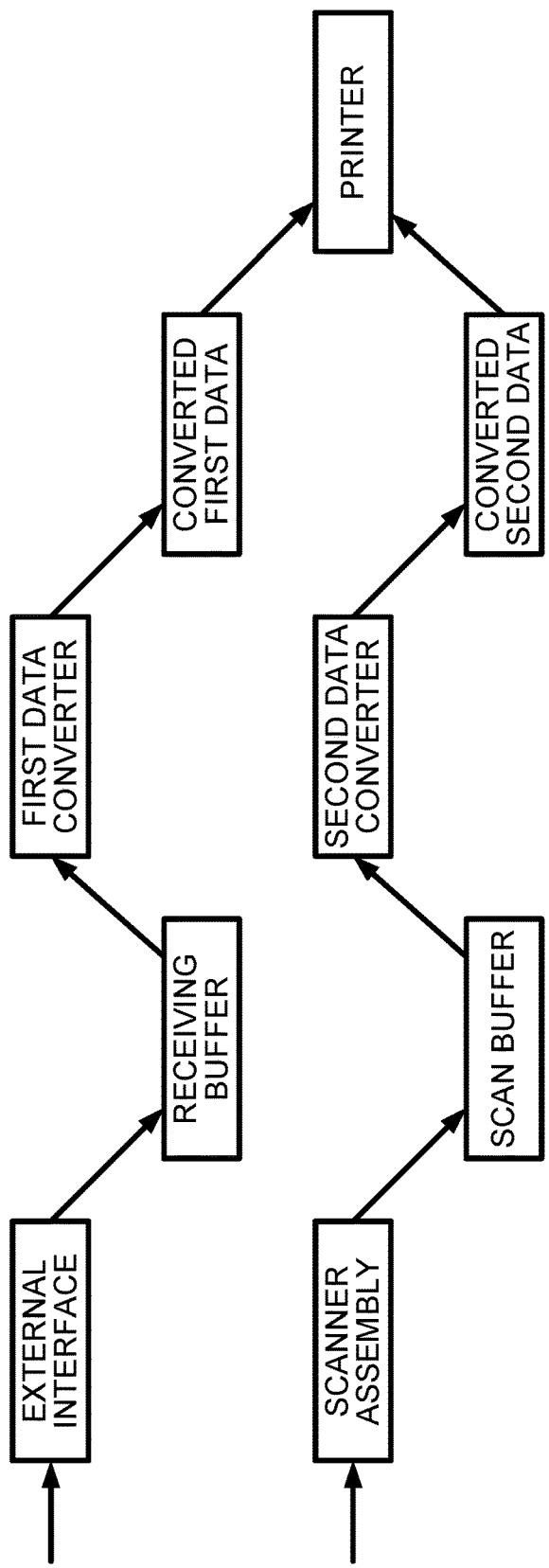
FIG. 5 is a diagram depicting first data conversion and second data conversion.
Figure 6:
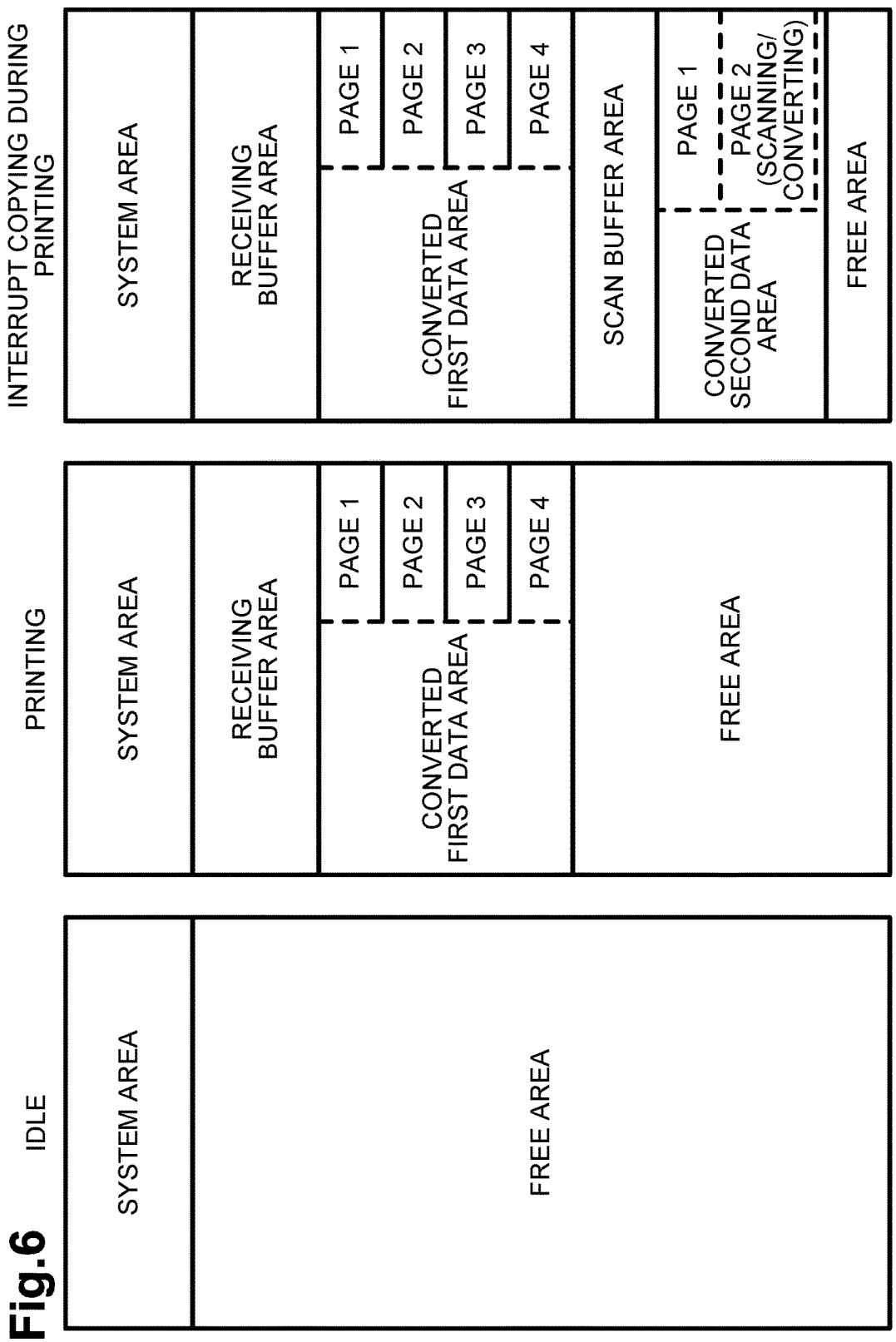
FIG. 6 is a diagram depicting an area of a RAM.

As depicted in FIG. 5, the controller 130 stores first data received through the external interface 138 in a receiving buffer, e.g., the RAM 133. Thereafter, the controller 130 converts or develops the first data stored in the receiving buffer into converted first data for printing by the printer 24. First data converted by a first data converter is hereinafter referred to as converted first data. The controller 130 stores the converted first data in a converted first data area of the RAM 133. Further, the controller 130 controls the printer 24 to execute printing based on the converted first data stored in the converted first data area. All memory space in the RAM 133 is partitioned into areas according to intended purposes, e.g., storage of data and processing of stored data. As depicted in FIG. 6, for the print function, some memory space in the RAM 133 is allocated or assigned to a system area, a receiving buffer area, and the converted first data area for, for example, four pages. The rest of the space in the RAM 133 is a free area that may be used in the interrupt copying. One page is defined by whole one side of a sheet S to be printed by the printer 24. The converted first data area may not necessarily be sized to hold four pages, but may be sized to hold the different number of pages. The converted first data area may be preferably sized to hold at least two pages, to enable smooth printing based on converted first data, in view of time required for conversion of first data into converted first data.

Figure 7:
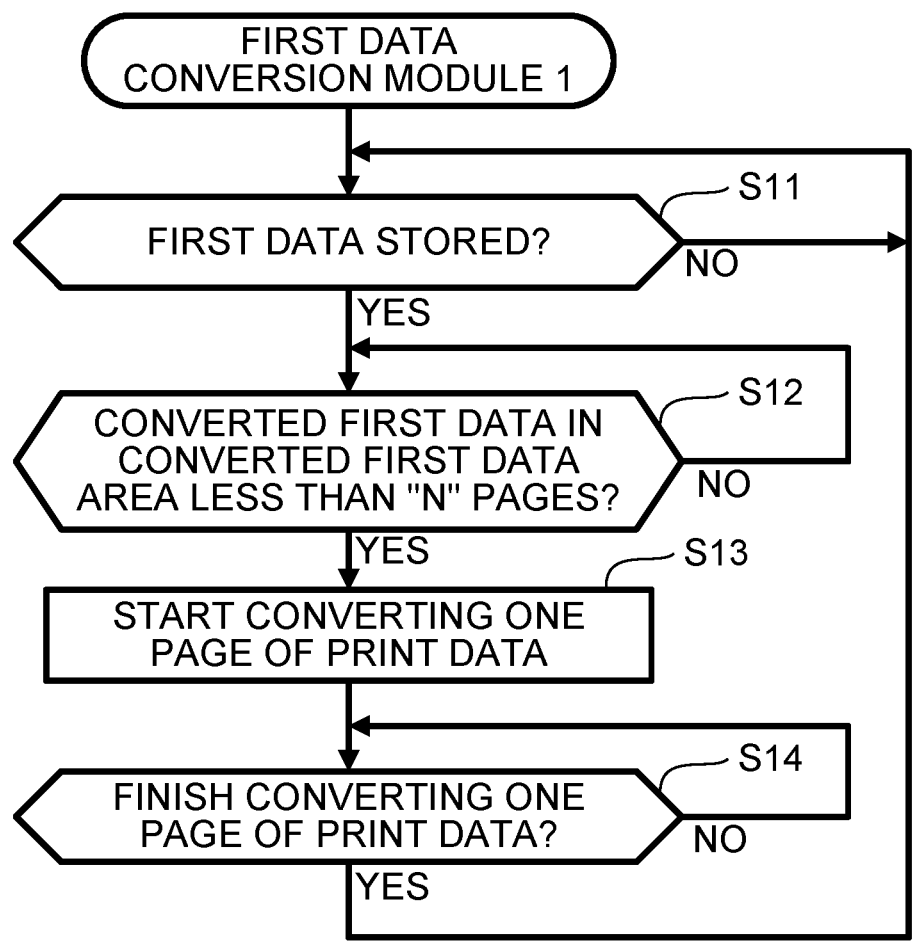
FIG. 7 is a flowchart of a first data conversion module.

As depicted in FIG. 7, the controller 130 continues to execute the first data conversion module 1 during power-on of the multi-function apparatus 10. Upon starting the first data conversion module 1, the controller 130 determines whether first data received from an external device is stored in the receiving buffer area of the RAM 133 (step S11). Based on determination that first data is not stored in the receiving buffer area (step S11: No), the controller 130 continues the step S11. Based on determination that first data is stored in the receiving buffer area (step S11: Yes), as well as less than four pages of converted first data stored in the converted first data area (described below) (step S12: Yes), the controller 130 executes step S13. In step S13, the controller 130 converts one page of first data stored in the receiving buffer, into converted first data.

More specifically, as depicted in FIG. 5, the controller 130 converts the first data stored in the receiving buffer area into the converted first data for printing by the printer 24. Thereafter, the controller 130 temporarily stores the converted first data based on the first data in the converted first data area of the RAM 133. The controller 130 deletes the first data from the receiving buffer area. The converted first data may include dot data produced by rasterizing first data for printing by the inkjet-type printer 24.

In step S12, the controller 130 determines an amount, e.g., the number of pages, of the converted first data temporarily stored in the converted first data area of the RAM 133. Based on determination that an amount of the converted first data temporarily stored in the converted first data area of the RAM 133 is less than four pages (step S12: Yes), the controller 130 converts first data of next one page, which is stored in the receiving buffer, into converted first data (step S13). Based on determination that an amount of the converted first data temporarily stored in the converted first data area of the RAM 133 is not less than four pages (step S12: No), the controller 130 waits for deletion of the converted first data subjected to printing (e.g., print module described below) from the converted first data area of the RAM 133. In a situation where first data is stored in the receiving buffer (corresponding to "Yes" in step S11), deletion of the converted first data subjected to printing from the converted first data area causes the converted first data area to have an available space (e.g., an amount of the converted first data in the converted first data area becomes less than four pages (corresponding to "Yes" in step S12)). Upon finishing conversion into converted first data of the next one page (step S14: Yes), the controller 130 deletes the first data subjected to conversion, from the receiving buffer area of the RAM 133. The controller 130 may repeat those steps if first data is stored in the receiving buffer area of the RAM 133 (step S11: Yes).

Figure 9:
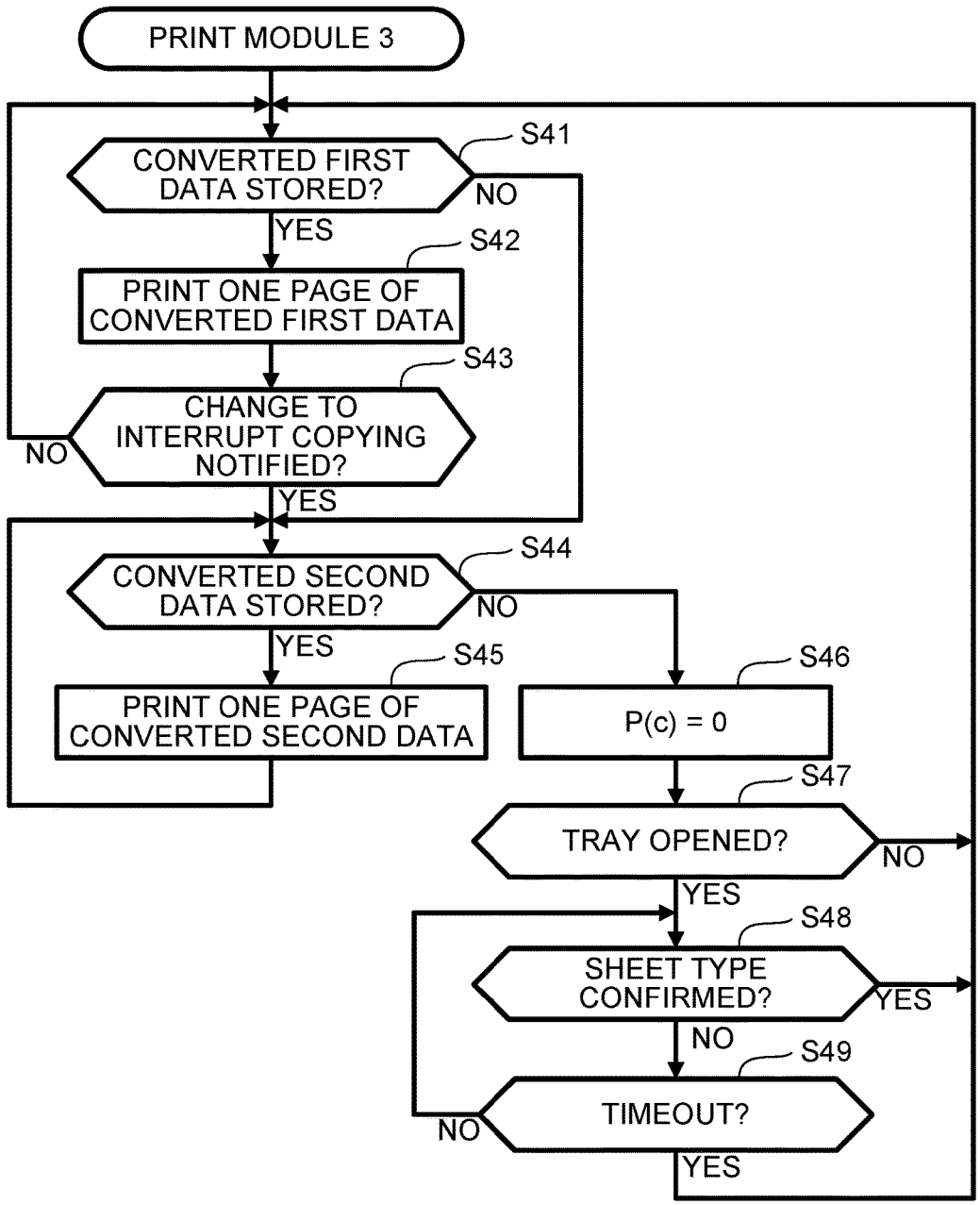
FIG. 9 a flowchart of a print module.

As depicted in FIG. 9, as long as converted first data is temporarily stored in the RAM 133 (step S41: Yes), the controller 130 controls the printer 24 to execute printing based on the converted first data (step S42). The controller 130 may receive a user input on the control panel 17 for initiating the copy function, and another user input for selecting interrupt copying, which will described later. In response to the another user input for selecting interrupt copying, the controller 130 notifies the print module 3 of change to interrupt copying. Such notification causes the controller 130 to execute interrupt copying, after converted first data for one page has been printed in the print module 3 (step S42).

As described above, while a particular user is remotely operating the multi-function apparatus 10 through an external device for printing, another user may locally operate the multi-function apparatus 10 for copying (i.e., interrupt copying). In copying, data to be printed is received from a second data source, such as the scanner assembly 12. For example, the scanner assembly 12 scans data to be printed by the printer assembly 11. In response to a user operation on the control panel 17, the controller 130 receives information representative of copy start. The scanner assembly 12 obtains second data to be printed. The second data includes bitmap data including arrays of information for pixels constituting a text and an image to be printed, and compressed bitmap data.

As depicted in FIG. 5, the controller 130 may receive second data from the scanner assembly 12. The controller 130 stores the received second data in a scan buffer, e.g., the RAM 133. Thereafter, the controller 130 converts or develops second data stored in the scan buffer, into converted second data for printing by the printer 24. the controller 130 stores the converted second data in a converted second data area. Second data converted by a second data converter is hereinafter referred to as the converted second data. Further, the controller 130 controls the printer 24 to execute printing based on the converted second data in the converted second data area. As depicted in FIG. 6, the RAM 133 may have some free area, e.g., an area other than the system area, the receiving buffer area, and the converted first data area that are allocated for the print function. Some memory space in the free area of the RAM 133 is allocated or assigned to the scan buffer area, and the converted second data area for, for example, two pages. In another embodiment, the converted second data area may be sized to hold the different number of pages.

In response to a user operation on the control panel 17, the controller 130 receives information representative of copy start. Reception of the information causes the controller 130 to control the scanner assembly 12 to scan an image on a document. The controller 130 stores second data into the scan buffer area of the RAM 133. The second data is representative of the image scanned by the scanner assembly 12. Reception of the information further causes the controller 130 to start executing the second data conversion module 2 depicted in FIG. 8.

Figure 8:
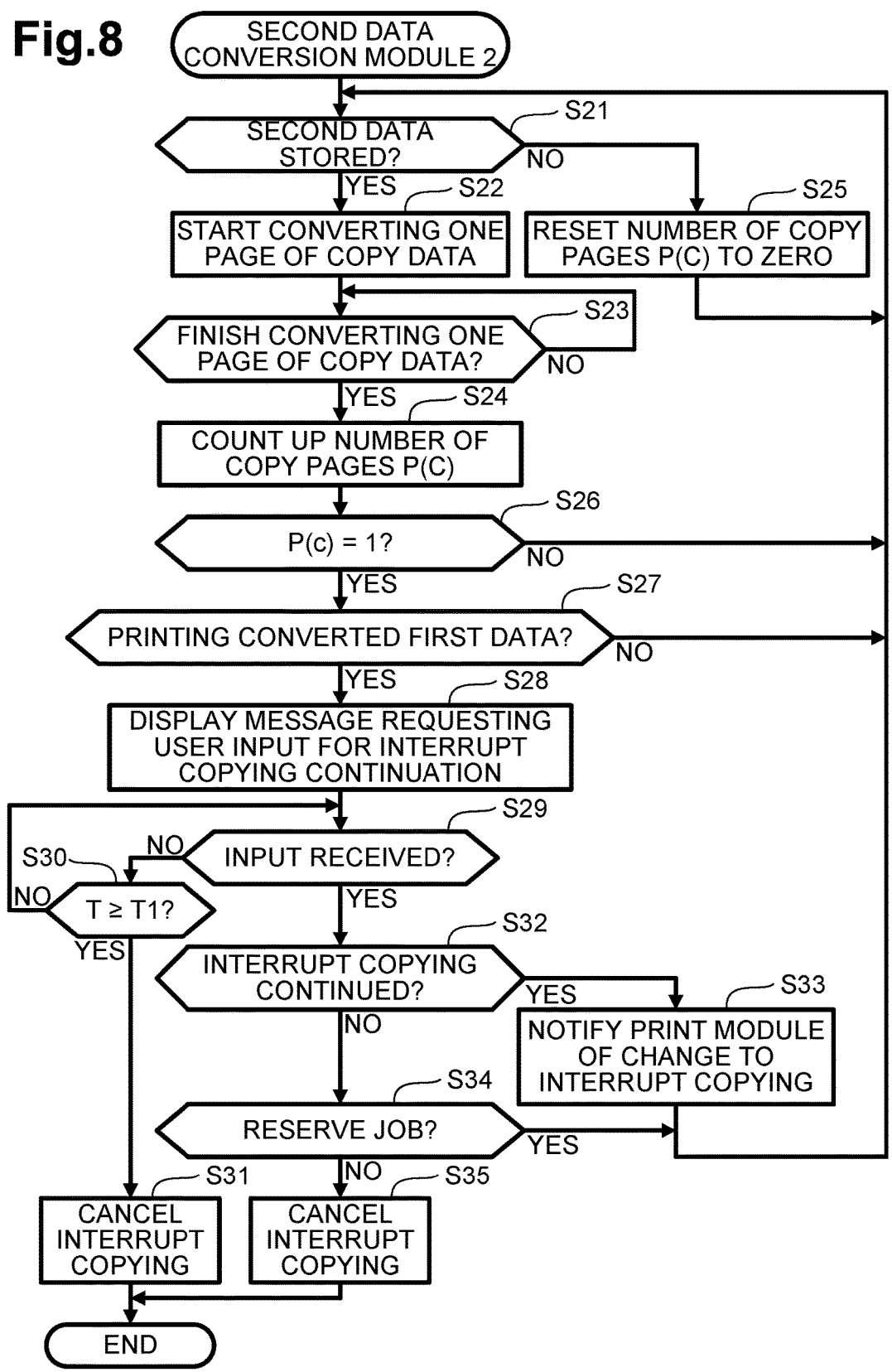
FIG. 8 is a flowchart of a second data conversion module.

As the controller 130 starts the second data conversion module depicted in FIG. 8, the controller 130 first determines whether second data is stored in the scan buffer area in the RAM 133 (step S21). Based on determination that the second data is stored in the scan buffer area (step S21: Yes), as depicted in FIG. 5, the controller 130 converts the stored second data into converted second data for printing by the printer 24 (step S22). In step S22, the controller 130 temporarily stores the converted second data in the converted second data area of the RAM 133. Upon finishing conversion of the second data for one page (step S23: Yes), the controller 130 deletes second data subjected to conversion from the scan buffer area, and counts up the number of copy pages P(c) (step S24). Based on determination that no second data is stored in the scan buffer area of the RAM 133 (step S21: No), the controller 130 clears or resets the number of copy pages P(c) to zero (step S25). The converted second data may include dot data produced by rasterizing second data for printing by the inkjet-type printer 24.

The controller 130 determines whether the number of copy pages P(c) shows "one" (or P(c) is greater than or equal to two) (step S26). Based on determination that the number of copy pages P(c) does not show "one" (e.g., P(c) is greater than or equal to two) (step S26: No), the controller 130 determines whether the second data is stored in the scan buffer area of the RAM 133 (step S21). Based on determination that the second data is stored in the scan buffer area (step S21: Yes), the controller 130 repeats the steps S22-S26 if the converted second data area is available. If the converted second data area is not available, the controller 130 waits until the converted second data area becomes available.

Based on that determination that the number of copy pages P(c) shows "one" (e.g., P(c)=1) (step S26: Yes), the controller 130 determines whether the printer assembly 11 is printing the converted first data (step S27). When the printer assembly 11 is not printing the converted first data (step S27: No), the controller 130 determines whether second data is stored in the scan buffer area (step S21). Based on determination that second data is stored in the scan buffer area (step S21: Yes), the controller 130 repeats the steps S22-S26 if the converted second data area is available. If the converted second data area is not available, the controller 130 waits until the converted second data area becomes available.

While the printer assembly 11 is printing the converted first data (step S27: Yes), the controller 130 controls the control panel 17 to display a message regarding whether an execution of the interrupt copying in stread of the printing based on the converted first data (step S28). More specifically, the message requests a user input selecting whether to continue with the interrupt copying (step S28). Further, the controller 130 counts the period of time elapsed after the message is display. The controller 130 controls the control panel 17 to display such a message, for example, "CONTINUE INTERRUPT COPY?<YES/NO>" and monitors a user input selecting <YES/NO>, for example, by touching a display area corresponding to <YES/NO> (steps S29 and S30). o Based on determination that the controller 130 does not receive any user input (step S29: No), and a predetermined time t1 has passed since the control panel 17 displays the message (step S30: Yes), the controller 130 cancels or terminates the interrupt copy (step S31). More specifically, the controller 130 deletes the second data and the converted second data in the RAM 133 (step S31).

Based on determination that the controller 130 receives through the control panel 17 a user input (step S29: Yes), electing to continue with the interrupt copying (step S32: Yes, e.g., by touching a display area corresponding to <YES>), the controller 130 notifies the print module 3, which is processing the current converted first data, of a change to interrupt copying (step S33). More specifically, the controller 130 sets a flag representing a change to interrupt copying.

Based on determination that the controller 130 receives through the control panel 17 a user input (step S29: Yes), electing to terminate the interrupt copying (step S32: No, e.g., by touching a display area corresponding to <NO>), the controller 130 controls the control panel 17 to display a message regarding selecting whether to make a jpb reservation (S34). In S34, the controller 130 also allows the control panel 17 to receive a user input at the control panel 17 of a response to the message. The job reservation is an instruction to proceed with copying, without a further user input for copy start, after current printing (e.g., a current print job) is finished. In step in S34, the controller 130 controls the control panel 17 to display such a message, for example, "RESERVE JOB?<YES/NO>" and monitors a user input selecting <YES/NO>, for example, by touching a display area corresponding to <YES/NO>.

Based on determination that the controller 130 receives through the control panel 17 a user input electing to reserve the job (step S34: Yes, e.g., by touching a display area corresponding to <YES>), the controller 130 determines whether second data is stored in the scan buffer area of the RAM 133 (step S21). Based on determination that second data is stored in the scan buffer area (step S21: Yes), the controller 130 repeats the steps S22-S26 if the converted second data area is available. If the converted second data area is not available, the controller 130 waits until the converted second data area becomes available.

Based on determination that the controller 130 receives through the control panel 17 a user input electing to unreserve the job (step S34: No, e.g., by touching a display area corresponding to <NO>), the controller 130 cancels or terminates the interrupt copying (step S35). More specifically, the controller 130 deletes second data and the converted second data in the RAM 133 (step S35)

As depicted in FIG. 9, if the converted first data is temporarily stored in the RAM 133, as described above (step S41: Yes), the controller 130 controls the printer 24 to execute printing for one page based on the converted first data (step S42). By the controller 130 executing step S42, a first image is printed. So the first image is printed based on the converted first data. Every time printing for one page is finished, the controller 130 checks for notification of a change to interrupt copying, e.g., determines whether a flag representing the change to interrupt copying is set (step S43).

Based on a flag set for interrupt copying (step S43: Yes), the controller 130 controls the printer 24 to suspend printing of the next page based on the converted first data. In addition, based on determination that the converted second data is temporarily stored in the converted second data area of the RAM 133 (step S44: Yes), the controller 130 controls the printer 24 to execute printing for one page based on the converted second data (step S45). By the controller 130 executing step S45, a second image is printed, So, the second image is printed based on the converted second data. In short, interrupt copying is executed. Thereafter, the controller 130 deletes the converted second data subjected to printing, from the RAM 133. Based on determination that the converted second data, which is not subjected to printing, is temporarily stored in the converted second data area of the RAM 133, the controller 130 controls the printer 24 to repeatedly execute printing for one page based on the converted second data.

After completion of printing of all pages based on the converted second data in the converted second data area, the converted second data is no longer stored in the converted second data area of the RAM 133. Based on determination that no converted second data is stored in the converted second data area (step S44: No), the controller 130 resets the counted value for the number of copy pages P(c) to zero (step S46).

The sensor 28 may detect the movement of the feed tray 20 before the suspended printing based on the converted first data is resumed (e.g., during printing based on the converted second data by the printer 24). In response to detection by the sensor 28, a flag is stored in the RAM 133. Based on determination that the flag is stored in the RAM 133 (step S47: Yes), the controller 130 controls the control panel 17 to display a message regarding selecting whether a sheet type is confirmed (step S48). In S48, the controller 130 also allows the control panel 17 to receive a user input at the control panel 17 of a response to the message. The controller 130 controls the control panel 17 to display such a message, for example, "RESUME PRINTING ON CURRENT SHEET? <YES>" and monitors a user input, for example, with a touch of a display area corresponding to <YES>. Based on determination that the flag is not stored in the RAM 133 (step S47: No), the controller 130 resumes printing based on the converted first data in the converted first data area of the RAM 133.

Based on determination that the controller 130 receives through the control panel 17 a user input electing sheet type confirmed (step S48: Yes), the controller 130 resumes printing based on the converted first data in the converted first data area of the RAM 133. Based on determination that the controller 130 does not receive, through the control panel 17, a user input as to sheet type confirmation (step S48: No) and a predetermined period of time has passed since the control panel 17 displays the message (step S49: Yes), the controller 130 resumes printing based on the converted first data in the converted first data area of the RAM 133. In response to an interrupt copy cancel input on the control panel 17 during interrupt copying, the controller 130 cancels the interrupt copying. More specifically, the controller 130 resumes printing based on the converted first data in the converted first data area of the RAM 133.

[Modification]

In the above-described illustrative embodiment, in interrupt copying, the controller 130 converts first data into converted first data. Temporary storage of the converted first data up to for four pages is allowed. In another embodiment, in response to converted second data temporarily stored in the RAM 133, the controller 130 may suspend temporary storage of converted first data, even when the RAM 133 has available space for converted first data, e.g., converted first data, which is stored in the RAM 133, is less than four pages. This configuration may ensure sufficient memory area to be allocated for interrupt copying to temporarily store converted second data in the RAM 133.

In the above-described illustrative embodiment, the controller 130 is configured to convert or develop first data, which is transmitted from an external device to the multi-function apparatus 10, into the converted first data. In another embodiment, for example, an external device having a printer driver installed therein may convert or develop first data into converted first data, and transmit the converted first data to the multi-function apparatus 10. In this case, the controller 130 may temporarily store the received converted first data for a plurality of pages in the RAM 133.

Figure 10:
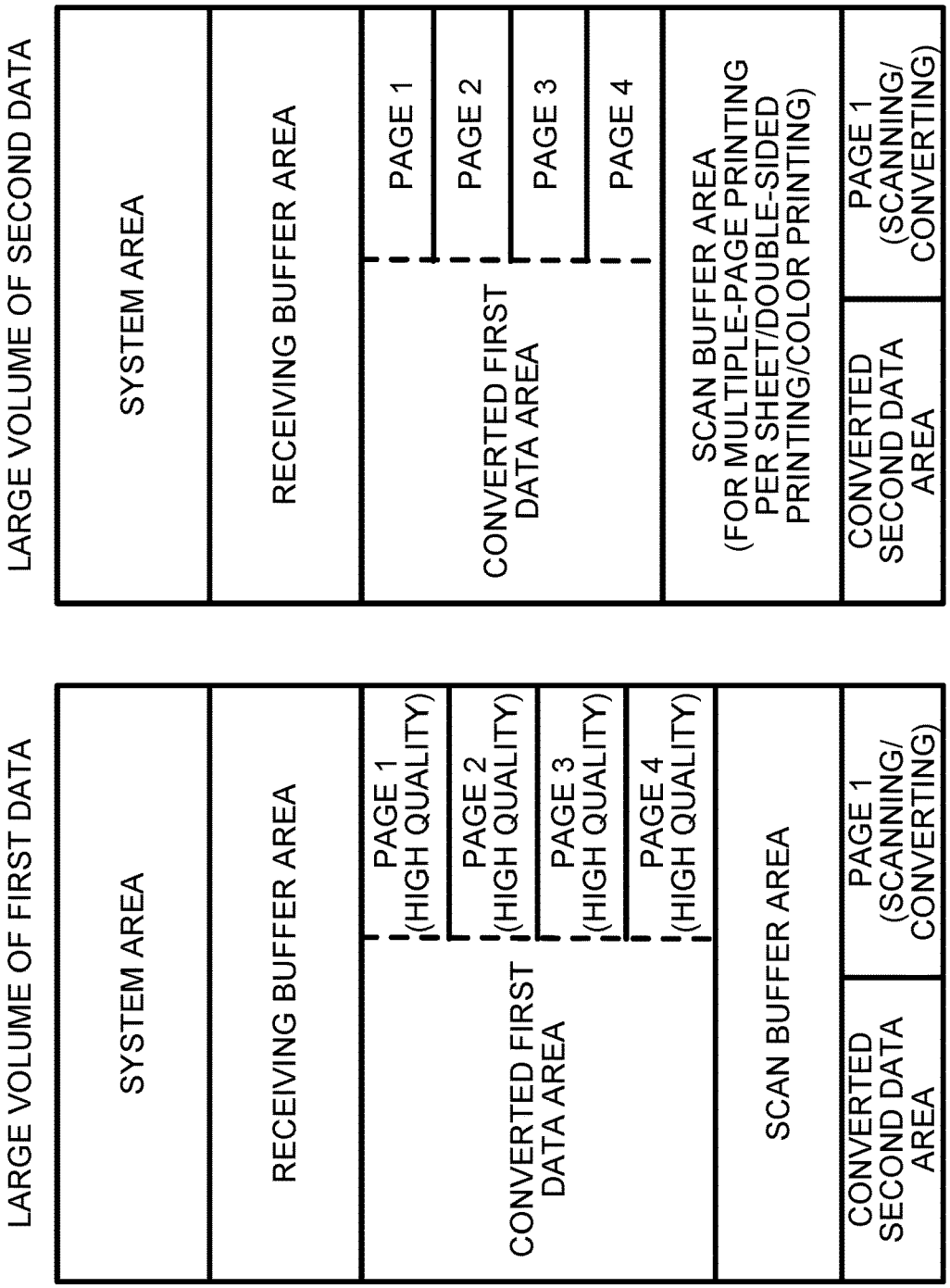
FIG. 10 is a diagram depicting an area of the RAM.

The controller 130 may be configured to determine whether to suspend temporary storage of converted first data, based on the volume of converted first data and converted second data. For example, as depicted in FIG. 10, converted first data area may be provided in the RAM 133 for converted first data for four pages in connection with high image quality. In this case, a percentage of converted first data area relative to all memory area of the RAM 133 increases, which may lead to insufficient memory area for the converted second data area. In another case, a percentage of a scan buffer area, which stores second data for double-sided printing and multiple-page printing per sheet, may increase relative to a free area in the RAM 133, which may also lead to insufficient memory area for the converted second data area.

For example, the controller 130 may be configured to execute volume determination processing. In the volume determination processing, the controller 130 may determine a volume or amount of converted first data based on print setting information from an external device, and that of converted second data based on copy setting information. Based on determination that the volume of the converted first data and the converted second data is less than a threshold value in the volume determination processing, the controller 130 may execute interrupt copying while allowing the conversion into the converted first data for four pages. In contrast, based on determination that the volume of the converted first data and the converted second data is greater than or equal to the threshold value, the controller 130 may pause the conversion into the converted first data during printing instructed by an external device. The controller 130 may pause conversion into converted first data, but continue printing based on converted first data. The converted first data subjected to printing [that has been printed] may be deleted to make some area in the RAM 133 available for temporarily storing at least a portion of converted second data. Based on some area in the RAM 133 made available, current printing based on converted first data may be paused or suspended to execute interrupt copying. In a case where the volume of converted first data and converted second data is greater than or equal to the threshold value, the controller 130 may pause the temporary storage of converted first data. Thus, some area in the RAM 133 may be made available promptly for converted second data area. In response to a user input for continuing with the interrupt copying, on the control panel 17, the controller 130 may pause the temporary storage of converted first data.

In interrupt copying, the RAM 133 may not have enough area for temporarily storing at least a portion of converted second data. The at least a portion of converted second data may be, for example, data for one page/one side of a sheet, for one pass to be printed by a traverse of the carriage 23, or for less than a predetermined threshold. In this case, the controller 130 continues printing based on converted first data, to make some area in the RAM 133 available. Based on some area in the RAM 133 made available for temporarily storing at least a portion of converted second data, the controller 130 may pause or suspend the current printing based on converted first data, to execute interrupt copying. Alternatively, in response to some area in the RAM 133 made available for temporarily storing at least a portion of converted second data, the controller 130 may pause or suspend the current printing based on converted first data, to execute interrupt copying. Theses configurations enable the multi-function apparatus 10 to execute interrupt copying even with the RAM 133 having a relatively small capacity.

In interrupt copying, the RAM 133 may not have enough area for temporarily storing at least a portion of converted second data. Again, the at least a portion of converted second data may be, for example, data for one page/one side of a sheet, for one pass to be printed by a traverse of the carriage 23, or for less than a predetermined threshold. In this case, the controller 130 may suspend temporary storage of converted first data but may continue current printing based on converted first data. The converted first data subjected to printing may be deleted. Based on some area in the RAM 133 made available for temporarily storing at least a portion of converted second data, the controller 130 may suspend or pause the current printing based on converted first data, to execute interrupt copying. Alternatively, in response to some area in the RAM 133 made available for temporarily storing at least a portion of converted second data, the controller 130 may suspend the current printing based on converted first data, to execute interrupt copying.

Although the above-described illustrative embodiment and modifications are described in conjunction with interrupt copying, an interrupt to current printing is not limited to copying, but may be, for example, storing image data read from a storage media in the RAM 133 and printing the data onto a sheet by the printer assembly 11. In this case, the multi-function apparatus 10 may preferably have a slot into which a portable storage medium may be inserted and a data reader which reads and obtains the image data from the portable storage medium. The data reader may be inside the slot.

In the above-described illustrative embodiment, the controller 130 is configured to cancel interrupt copying when a predetermined time has passed, without receiving any input, since the control panel 17 displays a message regarding whether an execution of the interrupt copying in stread of the printing based on the converted first data. In another embodiment, the controller 130 may be configured to reserve the job, without cancelling interrupt copying. This configuration allows automatic job reservation when a user, who initiates copying, walks away from the multi-function apparatus 10 without seeing the message on the control panel 17.

The controller 130 may not necessarily resume a suspended print job immediately after interrupt copying. For example, the controller 130 may be configured to control the control panel 17 to display a message requesting a user input selecting whether to initiate another copy job or resume the suspended print job. This configuration may allow a user to cause the multi-function apparatus 10 to subsequently execute or handle another interrupt copy job.

In the above-described illustrative embodiment, based on the sensor 28 detecting the movement of the feed tray 20 before the controller 130 resumes printing based on the converted first data (e.g., during printing based on the converted second data by the printer 24), the controller 130 controls the control panel 17 to display a message regarding selecting whether a sheet type is confirmed. The controller 130 also allows the control panel 17 to receive a user input at the control panel 17 of a response to the message. In another embodiment, the controller 130 may control the control panel 17 to display a message regarding selecting whether a sheet type is confirmed and may allow the control panel 18 to receive a user input response to the message, in a case where a sheet setting for a print job from an external device and a sheet setting for a copy job are different from each other.

[Example Effects]

In some disclosed embodiments, while the printer assembly 11 of the multi-function apparatus 10 is engaged in printing instructed by an external device, copy start may be input on the control panel 17, thereby activating the scanner assembly 12. The controller 130 receives the second data from the scanner assembly 12 and temporarily stores the converted second data, based on the second data, in the RAM 133. Based on converted second data temporarily stored in the RAM 133, current printing instructed by the external device may be suspended or paused, to execute copying. Alternatively, in response to the second data temporarily stored in the RAM 133, the current printing instructed by the external device may be suspended. Thus, interrupt copying is achieved. This configuration may reduce increase in the capacity of the RAM 133 for temporarily storing data, and further reduce a users' waiting time in interrupt copying.

The converted first data area of the RAM 133 is configured to store an amount of data corresponding to four pages. One page is defined by a whole area of one side of a sheet to be printed by the printer 24. In interrupt copying, based on the converted first data for four pages temporarily stored in the RAM 133, storage of further converted first data into the RAM 133 is stopped. This configuration limits an area where the converted first data is stored during interrupt copying.

In interrupt copying, in response to converted second data for one page stored temporarily in the RAM 133, the controller 130 controls the control panel 17 to display a message requesting a user input selecting whether to continue with the interrupt copying. This configuration enables the interrupt copying to be canceled in a case where a user does not want to continue with the interrupt copying after inputting a copy start, e.g., initiating copying.

In a case where interrupt copying is not continued, the controller 130 controls the control panel 17 to display a message regarding selecting whether to reserve the job (e.g., to make a job reservation). The controller 130 also allows the control panel 17 to receive a user input response to the message. The job reservation permits copying to be processed after a current print job is finished, in a case where a user, who initiates copying, does not want to interrupt the current print job.

The controller 130 controls the control panel 17 to display a message regarding selecting whether to continue with interrupt copying. The controller 130 also allows the control panel 17 to receive a user input response to the message. Based on no input received for a predetermined period of time after the message is displayed, the controller 130 cancels the interrupt copying. This configuration enables interrupt copying to be automatically canceled, for example, in a case where a user, who initiates copying, walks away from the multi-function apparatus 10 without seeing the message on the control panel 17.

The multi-function apparatus 10 includes the sensor 28 configured to detect the movement of the feed tray 20. The sensor 28 may detect the movement of the feed tray 20 while printing (e.g., a print job) is suspended. In response to the sensor 28 detecting the movement of the feed tray 20, the controller 130 controls the control panel 17 to display a message regarding selecting whether a sheet type is confirmed, before the suspended print job is resumed after interrupt copying. The controller 130 also allows the control panel 17 to receive a user input at the control panel 17 of a response to the message. Based on the user input, the controller 130 resumes the print job. Such message may draw users' attention to prepare a sheet suitable for printing before the print job is resumed after interrupt copying.

In interrupt copying, the controller 130 cancels interrupt copying based on a user's cancellation input on the control panel 17. The user's cancellation input during the interrupt copying, may not cause, for example, first data conversion for a suspended print job, to be terminated.

What is claimed is:

1. An image printing apparatus comprising:
    a printer assembly;
    a communication interface configured to communicate with a first data source external of the image printing apparatus;
    a second data source;
    a control panel configured to receive a user input; and
    a controller including a memory, the controller configured to:
        receive first data from the first data source via the communication interface;
        store the first data in the memory;
        control the printer assembly to print a first image based on the first data stored in the memory;
        during the print of the first image, receive a first user input from the control panel;
        in response to the first user input received from the control panel during the print of the first image, receive second data from the second data source;
        in response to the first user input received from the control panel during the print of the first image, determine whether the memory has an area for storing a predetermined portion of the second data;
        in response to determining that the memory has the area for storing the predetermined portion of the second data, store the second data in the memory during the print of the first image;
        in response to determining that the memory does not have the area for storing the predetermined portion of the second data, wait to store the second data without suspension of the storage of the first data; and
        based on the predetermined portion of the second data stored in the memory, control the printer assembly to suspend the mint of the first image.

2. The image printing apparatus of claim 1, wherein the second data source comprises a scanner assembly.

3. The image printing apparatus of claim 1, wherein the second data source comprises a data reader configured to obtain the second data from a portable storage medium.

4. The image printing apparatus of claim 1, wherein the controller is configured to, after suspension of the print of the first image, control the printer assembly to initiate to a print of a second image based on the second data stored in the memory.

5. The image printing apparatus of claim 4, wherein the controller is configured to,
based on the predetermined portion of the second data in the memory, receive a second user input from the control panel; and
in response to receive the second user input from the control panel, control the printer assembly to suspend the print of the first image.

6. The image printing apparatus of claim 4, wherein the controller is configured to, after upon completion of the print of the second image, allow the control panel to receive a response indicating whether to reprint the second image or resume printing the suspended printing of the first image.

7. The image printing apparatus of claim 1, wherein the predetermined portion of the second data includes data for one page, the one page defined by one side of a recording medium to be printed by the printer assembly.

8. The image printing apparatus of claim 1, wherein:
the printer assembly includes a print head configured to print on a recording medium on a pass-by-pass basis while moving relative to the recording medium; and
the predetermined portion of the second data includes data for one pass to be printed by the print head.

9. The image printing apparatus of claim 1, wherein the controller is configured to store the first data of up to a plurality of pages in the memory, one side of a recording medium to be printed by the printer assembly defining one page of the plurality of pages.

10. The image printing apparatus of claim 9, wherein the controller is configured to store the first data of up to four pages.

11. The image printing apparatus of claim 1, wherein the controller is configured to, in response to determining that the memory does not have the area for storing the predetermined portion of the second data, continue the print of the first image.

12. The image printing apparatus of claim 11, wherein the controller is configured to:
in response to the first user input received from the control panel during the print of the first image, periodically determine whether the memory has the area for storing the predetermined portion of the second data; and
in response to a second determining that the memory has the area for storing the predetermined portion of the second data after a first determining that the memory does not have the area for storing the predetermined portion of the second data, store the second data.

13. The image printing apparatus of claim 1, wherein the controller is configured to, in response to determining that the memory has the area for storing the predetermined portion of the second data, store the second data.

14. The image printing apparatus of claim 1, wherein the controller is configured to:
determine a volume of the first data and the second data;
in response to determining that the volume of the first data and the second data is greater than or equal to a threshold value, suspend storage of the first data and continue to print a predetermined portion of the first image;
delete the printed predetermined portion of the first data; and thereafter
store the second data in the memory.

15. The image printing apparatus of claim 14, wherein the controller is configured to:
after deleting the predetermined portion of the first data, control the printer assembly to suspend the print of the first image; and thereafter
store the second data in the memory.

16. The image printing apparatus of claim 14, wherein the controller is configured to, in response to determining that the volume of the first data and the second data is less than the threshold value, store the second data in the memory.

17. The image printing apparatus of claim 14, wherein the controller is configured to determine:
the volume of the first data based on first setting information received from the first data source via the communication interface; and
the volume of the second data based on second setting information received from the control panel in response to receipt of the first user input.

18. The image printing apparatus of claim 1, wherein the controller is configured to:
determine whether a first recording medium type on which the first image is printed and a second recording medium type on which the second image is printed are different from each other, and
based on the determination that the first recording medium type on which the first image is printed and the second recording medium type on which the second image is printed are different from each other, control the control panel to display a message requesting confirmation of a recording medium type, and to receive a response to the message.

19. The image printing apparatus of claim 18, wherein the controller is configured to, based on a receipt of a response confirming the recording medium type, resume the print of the first image.

20. The image printing apparatus of claim 1, further comprising:
a feed tray configured to store a recording medium to be printed on by the printer assembly; and
a sensor configured to detect movement of the feed tray,
wherein the controller is configured to, based on the sensor detecting the movement of the feed tray after suspending the print of the first image, control the control panel to display a message requesting confirmation of a recording medium type and to receive a response to the message.

21. The image printing apparatus of claim 20, wherein the controller is configured to, based on a receipt of a response confirming the recording medium type, resume the print of the first image.

22. An image printing apparatus, comprising:
a printer assembly;
a communication interface configured to communicate with a first data source external of the image printing apparatus;
a second data source;
a control panel configured to receive a user input; and
a controller including a memory, the controller configured to:
receive first data from the first data source via the communication interface;
store the first data in the memory;
control the printer assembly to print a first image based on the first data stored in the memory;
during the print of the first image, receive a first user input from the control panel;
in response to the first user input received from the control panel during the print of the first image, receive second data from the second data source;
in response to the first user input received from the control panel during the print of the first image, determine whether the memory has an area for storing the predetermined portion of the second data;

in response to determining that the memory does not have an area for storing the predetermined portion of the second data, suspend of the storage of the first data and wait to store the second data; and based on a predetermined portion of the second data stored in the memory, control the printer assembly to suspend the print of the first image.

23. The image printing apparatus of claim 22, wherein the controller is configured to, in response to determining that the memory does not have the area for storing the predetermined portion of the second data, continue the print of the first image.

24. The image printing apparatus of claim 23, wherein the controller is configured to:

in response to the first user input received from the control panel during the print of the first image, periodically determine whether the memory has the area for storing the predetermined portion of the second data; and in response to a second determining that the memory has the area for storing the predetermined portion of the second data after a first determining that the memory does not have the area for storing the predetermined portion of the second data, store the second data.

25. The image printing apparatus of claim 22, wherein the controller is configured to, in response to determining that the memory has the area for storing the predetermined portion of the second data, store the second data.

26. The image printing apparatus of claim 22, wherein the controller is configured to, based on the predetermined portion of the second data stored in the memory, allow the control panel to receive a user input at the control panel indicating whether the second image is to be printed before the first image.

27. The image printing apparatus of claim 26, wherein the controller is configured to, based on the predetermined portion of the second data stored in the memory, control the control panel to display a message regarding whether the second image is to be printed before the first image.

28. The image printing apparatus of claim 26, wherein the controller is configured to, based on receipt at the control panel of a response to not print the second image before completing printing of the first image, print the second image after completion of the print of the first image.

29. The image printing apparatus of claim 26, wherein the controller is configured to, based on receipt at the control panel of a response to not print the second image instead of the first image, delete the second data in the memory.

30. The image printing apparatus of claim 26, wherein the controller is configured to, based on that a predetermined time has passed without receiving a second user input after allowing the control panel to receive the second user input to print the second image after completion of the print of the first image.

31. The image printing apparatus of claim 26, wherein the controller is configured to, based on that a predetermined time has passed without a second user input after allowing the control panel to receive the second user input, delete the second data in the memory.

32. A method for controlling operation of an image printing apparatus, the method comprising:

receiving first data from a first data source external of the image printing apparatus via a communication interface of the image printing apparatus;

storing the first data in a memory of the image printing apparatus;

printing a first image based on the first data stored in the memory;

during the print of the first image, receiving a first user input from a control panel of the image printing apparatus;

in response to the first user input received from the control panel during the print of the first image, receiving a second data from a second data source of the image printing apparatus;

in response to the first user input received from the control panel during the print of the first image, determining whether the memory has an area for storing a predetermined portion of the second data;

in response to determining that the memory has the area for storing the predetermined portion of the second data, storing the second data in the memory during the print of the first image;

in response to determining that the memory does not have the area for storing the predetermined portion of the second data, waiting to store the second data without suspension of the storage of the first data; and based on the predetermined portion of the second data stored in the memory, suspending the print of the first image.

33. An image printing apparatus comprising:

a printer assembly;

a communication interface configured to communicate with an external device;

a control panel configured to receive user input;

a scanner assembly; and a controller including a memory, the controller configured to:

receive first data from the external device via the communication interface;

store the first data in the memory;

control the printer assembly to print a first image based on the first data stored in the memory;

during the print of the first image, receive a first user input from the control panel of the image printing apparatus;

in response to the first user input received from the control panel during the print of the first image, receive second data from the scanner assembly;

store the second data in the memory during the print of the first image;

after one page of the second data is stored in the memory, allow the control panel to receive a second user input indicating that a second image should be printed instead of the first image, the one page of the second data defined by one side of a recording medium to be printed by the printer assembly;

receive the second user input;

in response to receiving the second user input, controlling the printer assembly to suspend printing of the first image; and after suspension of the printing of the first image, control the printer assembly to print the second image.

* * * * *

UNITED STATES PATENT AND TRADEMARK OFFICE
CERTIFICATE OF CORRECTION

PATENT NO. : 10,091,381 B2  
APPLICATION NO. : 15/366729  
DATED : October 2, 2018  
INVENTOR(S) : Sugiyama et al.

Page 1 of 1

It is certified that error appears in the above-identified patent and that said Letters Patent is hereby corrected as shown below:

In the Claims

Claim 1:
Column 14, Line 57: Delete "mint" and insert -- print -- therefor.

Signed and Sealed this
Twenty-sixth Day of February, 2019

Andrei Iancu
*Director of the United States Patent and Trademark Office*